United States Patent [19]
Bannies

[11] 3,784,730
[45] Jan. 8, 1974

[54] COUPLING ASSEMBLY FOR SHIELDED TUBULAR JACKETING

[75] Inventor: Hans E. Bannies, Laguna Beach, Calif.

[73] Assignee: Walter A. Plummer, Sherman Oaks, Calif.

[22] Filed: Oct. 6, 1972

[21] Appl. No.: 295,570

[52] U.S. Cl............. 174/75 C, 174/89, 285/161, 285/248
[51] Int. Cl............................................. H02g 15/00
[58] Field of Search............... 285/248, 249, 250, 285/382.7, 161, 243; 174/65 R, 78, 51, 36, 35 SM, 89, 75 C

[56] References Cited
UNITED STATES PATENTS

| | | | |
|---|---|---|---|
| 3,374,307 | 3/1968 | Raven et al. | 174/89 |
| 3,206,540 | 9/1965 | Cohen | 174/89 |
| 2,798,744 | 7/1957 | Budnick et al. | 285/249 X |
| 2,648,550 | 8/1953 | Courtot | 285/382.7 X |
| 2,960,561 | 11/1960 | Plummer | 174/36 |
| 2,782,060 | 2/1957 | Appleton | 285/248 |
| 2,321,260 | 6/1943 | Stecher | 285/249 |
| 2,833,569 | 5/1958 | Budnick | 285/161 X |
| 3,467,761 | 9/1969 | Plummer | 174/36 |

Primary Examiner—Thomas F. Callaghan
Attorney—Wm. Douglas Sellers et al.

[57] ABSTRACT

A coupling for connecting a shielded tubular jacket equipped with a re-openable seam to another shielding assembly in a mechanically strong inexpensive and electrically efficient manner. The metal lined jacket is clamped between the tubular metal insert at the end of the jacket and a surrounding annularly beaded sleeve having a split sufficiently wide to accommodate the jacket seam and forcibly contractable about the jacket as the coupling clamping nut is cammed against the annular bead during tightening of the clamping nut. The clamping nut also compresses the tubular insert axially against a threaded metal bushing to complete an electrical bond between the jacket shield and other shielding means for the contents of the jacket.

7 Claims, 4 Drawing Figures

PATENTED JAN 8 1974

3,784,730

COUPLING ASSEMBLY FOR SHIELDED TUBULAR JACKETING

This invention relates to coupling assemblies, and more particularly to an improved, inexpensive, separable coupling for use in interconnecting a shielded tubular jacket to a junction box, a tubular fitting or another length of shielded jacketing to provide a continuous, gapless, electrical shield throughout the length of components in need of high efficiency shielding.

It is becoming increasingly essential that electronic and other installations utilize cable connections encased in highly efficient radio frequency shielding jackets. Oftentimes, existing cabling or other conductors available for installation is not shielded. Seamed tubular jackets with a built-in shielding layer are available for assembly about such cabling but, prior to the present invention, there has not been available satisfactory provision for efficiently connecting the ends of such jackets to one another or to other shielded fittings or housings. As is well known, efficient and effective shielding cannot tolerate the presence of gaps in the continuity of the shielding as this permits entry of stray currents and electric fields which degrade and otherwise interfere with the fidelity of signals carried by the conductors sought to be shielded. Attempts have been made by designers to provide coupling assemblies for mechanically and electrically interconnecting and interbonding shielded cable jackets to other shielded components. However, such attempts have been subject to serious shortcomings and disadvantages, involve the use of an excessive number of costly components, are time consuming to install, and are otherwise faulty and unreliable.

The foregoing and other shortcomings or prior radio frequency coupling assemblies for seamed tubular shield jackets are avoided by the present invention. The new coupling includes a pair of lightweight, thin-walled, concentric metal tubes held sandwiched against the inner and outer surfaces of the shield jacket by a threaded bushing and a clamping nut. The inner and smaller of the two tubes has an out-turned flange at one end abutting the end edges of the shield jacket and the split outer sleeve has an outwardly projecting annular bead engageable by a camming surface on a surrounding clamp nut effective to contract the split sleeve and the underlying jacket against the tubular insert. This camming action is simultaneously effective to force these components axially forward to press the flange of the inner sleeve against the shoulder of the coupling bushing. This bushing has a conical well at one end sized to engage the inner end of the split sleeve and cam the latter inwardly to compress the shield jacket firmly against the inner tube as well as to center the latter concentrically of the coupling bushing as the clamping nut is tightened. It will therefore be appreciated from the foregoing that the invention coupling avoids the shortcomings of prior proposals and provides a simple, compactly arranged assembly arranged concentrically of the jacket end and cooperating to provide a continuous, gapless electrical and mechanical connection between the shield jacket and the main body of the coupling assembly.

Accordingly, it is a primary object of the present invention to provide an improved, high strength, high efficiency shielded connection between a shielded tubular jacket for cabling and contiguous conductive fittings.

Another object of the invention is the provision of easily manipulated inexpensive components for completing a high efficiency, highly reliable, gapless bonding connection between a separable coupling assembly and the shielding layer of seamed tubular jacketing for electrical conductors.

These and other more specific objects will appear upon reading the following specification and claims and upon considering in connection therewith the attached drawing to which they relate.

Referring now to the drawing in which a preferred embodiment of the invention is illustrated:

Figure 1:
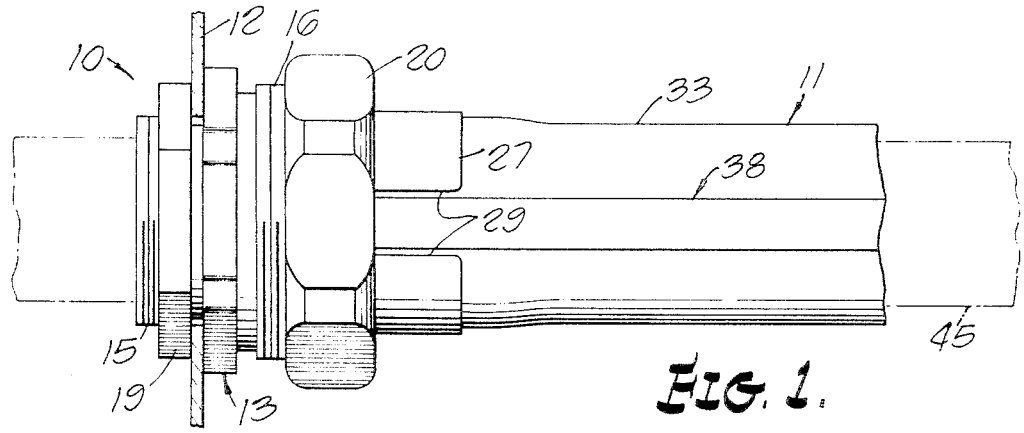
FIG. 1 is a fragmentary side elevational view of an illustrative embodiment of the invention fully assembled to a seamed tubular shielded jacket for cabling and held assembled to a junction box.
Figure 2:
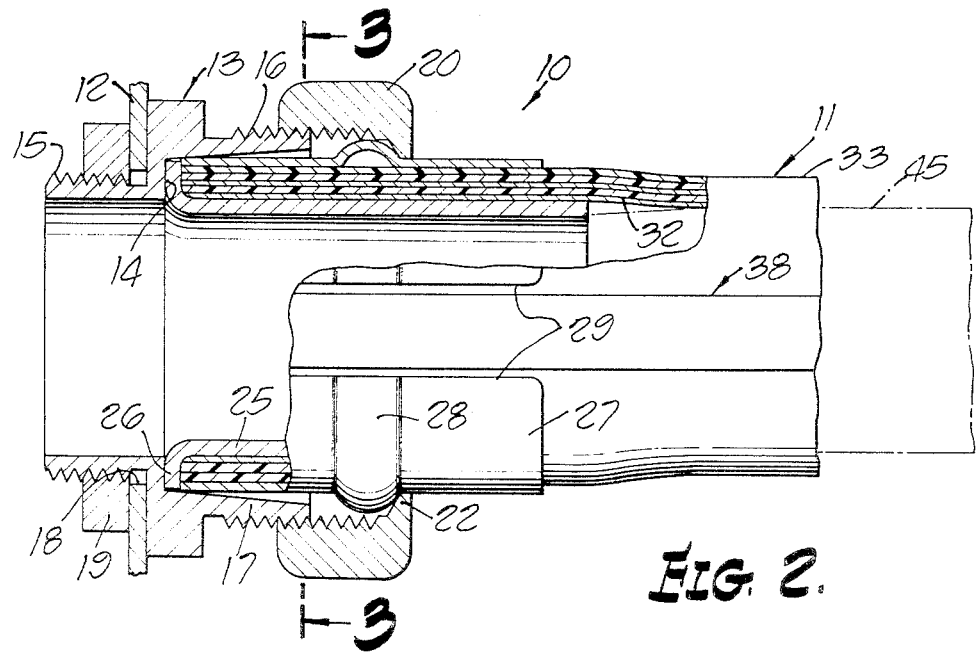
FIG. 2 is a fragmentary cross sectional view on an enlarged scale of the assembly shown in FIG. 1.

Referring initially more particularly to FIGS. 1 and 2, there is shown a preferred embodiment of the invention coupling, designated generally 10, fully assembled to seamed tubular shield jacketing 11 and clamped to a grounded metallic fitting or a junction box one wall of which is indicated at 12. Coupling assembly 10 is formed entirely of metal and includes a bushing 13 having an inwardly projecting stop surface or shoulder 14 and threaded ends 15 and 16. The interior sidewall 17 at the larger end of bushing 13 converges at an angle of approximately 5°–10° for reasons which will be explained more fully presently. Threaded end 15 projects through an opening 18 in the wall of junction box 12 and is rigidly clamped thereto by nut 19 mating with threads 15. Rotatably supported on threads 16 is a clamping nut 20 having an inturned camming flange 22 having important functions to be described in greater detail presently.

Coupling 10 further includes an inner tubular insert 24 having an outwardly projecting radial flange 26 at one end adapted to be pressed into firm seating contact with stop surface 14 of bushing 13 by abutment with the inner end of a second tubular member 27. The latter comprises a thin-walled split tube formed from thin resilient sheet stock and having an outwardly projecting annular bead 28 encircling its mid portion. The lateral edges 29,29 of the slit in sleeve 27 are spaced sufficiently wide to accommodate the seam 30 of the tubular jacet 11 adapted to be clamped between insert 25 and sleeve 27. The rounded exterior surface of bead 28 is engaged by the rounded inner surface of the camming flange 22 on clamping nut 20, with the result that the camming flange tends to ride up along the rounded surface of bead 28 thereby to collapse the sleeve 27 inwardly as clamping nut 20 is tightened. Te contraction and self-centering of sleeve 27 is also materially augmented by the camming action provided by the converging or conical surface 17 of bushing 13. Surface 17 engages the inner end portion of sleeve 27 and forces the latter to contract as the sleeve is forced axially of the bushing by the tightening of nut 20. This constrictive camming action also serves the important functions of compressing jacketing 11 against tube 25 while simultaneously forcing flange 26 of the latter into firm contact with stop surface 14 and accurately centering tube 25 concentrically of bushing 13.

Figure 3:
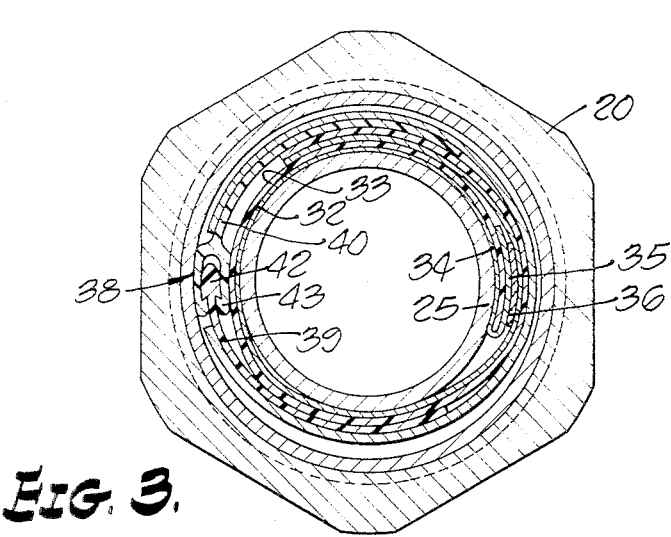
FIG. 3 is a cross sectional view on an enlarged scale taken along line 3—3 on FIG. 2.

The tubular shield jacket 11 has a supple flexible main body including an inner metallic shielding layer 32 secured to and coextensive with an impervious sheet plastic layer 33. The width of this elongated main body is greater than the girth of the jacket when its seam is assembled and includes a guard flap 34 bridging the closed seam and having its free edge overturned outwardly as indicated at 35 so that the metallic shield layer faces outwardly in position to lie firmly in contact with the juxtaposed surface of the shield layer, as is clearly indicated in FIG. 4. Preferably and as shown in FIG. 3, the overturned lateral edge of the guard flap also has secured to its outwardly facing side a conductive grounding conductor 36 in accordance with the disclosure of U.S. Pat. No. 3,089,915 to W. A. Plummer to facilitate grounding the end of the shield jacket remote from coupling 13. This assures a continuous and gapless metallic shield completely encircling the interior sidewall of the jacket.

Figure 4:
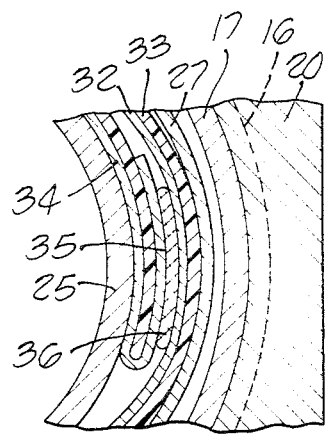
FIG. 4 is a fragmentary sectional view on an enlarged scale through the closed seam area of the shield jacket.

The reopenable and reclosable seam designated generally 38 for holding the opposite lateral edges of the main body firmly closed includes two extruded plastic tapes of supple plastic material having mounting flanges 39, 40 bonded or heat fused to the opposite lateral sides of the main body as best shown in FIG. 4. Thus, mounting flange 39 is bonded to the left hand edge of the guard flap 34 along an area spaced substantially to the left of the right hand edge of the guard flap for this flap to bridge seam 38 when closed. The mounting strip 40 for the other seam member is likewise bonded or heat fused to the other lateral edge of the main body. The free edge 42 of mounting strip 39 is of T-shape in cross section whereas the mating free edge 43 of mounting strip 40 is of U-shape in cross section. This type of interlocking seam is well known and disclosed in detail in U.S. Pat. No. 3,467,761 granted to W A. Plummer on Sept. 16, 1969. Likewise the main body of the shielded jacket is fully disclosed in U.S. Pat. to W. A. Plummer No. 2,960,561, granted Nov. 15, 1960.

The assembly of the invention coupling is accomplished by closing seam 38 of jacket 11 lengthwise of the jacket using a suitable closure tool to insert the T-head 42 of one seam tape progressively between the U-shaped legs 43 of the other seam tape. As seam 38 is closed toward the left as viewed in FIG. 2, the tubular insert 25 may be telescoped into the jacket until its flange 26 snugly abuts the end of the jacket. Clamping nut 20 and split sleeve 27 are then telescoped over the end of the jacket to the position shown in FIG. 2, care being exercised to have split 29 straddling seam 38. The outer end edge of sleeve 27 is usually positioned flush against flange 26 of tubular sheet 25.

The assembled parts are not inserted into the larger end of threaded bushing 13 and clamping nut 20 is engaged with threads 16 of the bushing and wrenched in a tightening direction. As this takes place, camming flange 22 of nut 20 engages the rounded exterior surface of bead 28 producing a strong inwardly camming action to contract the sleeve 27 against the underlying surfaces of jacket 11 thereby compressing the latter against tube 25. This contraction of sleeve 27 is materially assisted by the camming action of conical surface 17 on the inner end of sleeve 27 which, as pointed out previously, provides powerful constrictive action on the entire forward portion of the sleeve while at the same time compressing the shielding layer 32 into firm contact with tube 25 and centering the latter concentrically of surface 17. In this manner the metallic shielding layer 34 is compressed by dual camming actions at spaced-apart areas firmly into wide area bonding contact with the tubular insert 25 and, at the same time, the overturned portion 35 of the shielding layer is pressed firmly against the juxtaposed surface of this layer assuring continuous and gapless contact between the opposite lateral edges of the shield layer. Tightening of nut 20 also forces the shielding jacket against the juxtaposed end face of flange 26 as the outer end face of this flange is pressed forcibly against stop surface 14 of bushing 13.

The assembly of the coupling and jacket is now completed and there is provided a gapless and continuous metal shield for conductors or cabling, indicated by the dot and dash lines 45 in FIGS. 1 and 2, throughout the length of jacket 11 and including the terminal and coupling fittings clamped to the terminal end of the jacket. Moreover, the conductive shielding layer of the jacket is bonded to the coupling fittings and to the grounded enclosure or function box indicated at 12. Alternatively threads 15 of the bushing 13 may be clamped to other metallic tubular fittings connectable to another similar shielded jacket extending to the left, as viewed in FIG. 2, or to any other grounded conductive shield structure.

While the particular coupling assembly for shielded tubular jacketing herein shown and disclosed in detail is fully capable of attaining the objects and providing the advantages hereinbefore stated, it is to be understood that it is merely illustrative of the presently preferred embodiment of the invention and that no limitations are intended to the detail of construction or design herein shown other than as defined in the appended claims.

I claim:

1. That improvement in metallic coupling means for mechanically coupling and electrically bonding a separably seamed tubular jacket detachably to a threaded metal bushing and which tubular jacket is of the type having a flexible main body including a metallic inner electrical shield layer the lateral edges of which overlap in the assembled condition of said jacket and an outer layer of non-conductive material secured to one another, said main body having interlocking seam-forming means extending generally parallel to one another along the opposite lateral edges thereof to hold said jacket assembled as a tube, said seam-forming means being narrow and substantially thicker than said main body; metallic coupling means for clamping said jacket in registry with one end of a threaded metal bushing, said coupling means comprising a tubular metal insert telescoped into one end of said tubular jacket and in contact with the inner surface of the metallic layer thereof, said insert having a radially narrow flange at its outer end in closely spaced abutting relation to the adjacent end of said jacket, a thin-walled split sleeve encircling said jacket with the edges of its split closely spaced beside a respective lateral edge of the interlocked edges of said seam-forming means, said split sleeve having an outwardly projecting bead encircling the same intermediate the opposite ends of said sleeve, and threaded clamping nut means surrounding said split sleeve and engaging the threads of said metal bushing and including means effective as said bushing is tightened to engage the exterior surface of said bead to contract said sleeve thereby to clamp the adjacent end of said jacket immovably assembled to said tubular metal insert and to said threaded bushing.

2. That improvement defined in claim 1 characterized in that said split sleeve is formed of thin resilient sheet metal stock and having an unassembled normal diameter fitting loosely over said tubular jacket and into light gripping contact with interior surfaces of said clamping nut means before the latter is tightened to said threaded bushing.

3. That improvement defined in claim 1 characterized in that said bead formed in said split sleeve is located about the mid length thereof, and the inner end of said split sleeve being positioned to firmly abut and press against the radial flange of said tubular metal insert as said clamping nut means is tightened.

4. That improvement defined in claim 3 characterized in that said threaded bushing has stop surface means projecting inwardly from the interior sidewall thereof in position to abut the end face of the radial flange of said tubular insert as said clamping nut means is tightened.

5. That improvement defined in claim 1 characterized in that said threaded bushing has an inwardly converging sidewall embracing said split sleeve and cooperating with the advance end thereof to contract said split sleeve as the tightening of said clamping nut means forces said split sleeve axially into said threaded bushing.

6. That improvement defined in claim 1 characterized in that said threaded bushing has an interior annular sidewall which converges toward a radially disposed annular stop surface engageable with said radial surface at the forward end of said tubular insert in the assembled position of the latter, and said converging sidewall of said bushing being effective to engage the adjacent end of said split sleeve to contract the same and compress said tubular jacket against said tubular insert as said clamping nut means is tightened.

7. That improvement defined in claim 6 characterized in that the axial length of the converging sidewall of said bushing is so proportioned relative to the length of said split sleeve forwardly of said outwardly projecting bead that the tightening of said clamping nut means engages said radially narrow flange of said tubular insert and forces the same axially into pressure contact with said annular stop surface of said threaded bushing.

* * * * *